(12) United States Patent
Holden et al.

(10) Patent No.: US 7,384,565 B2
(45) Date of Patent: Jun. 10, 2008

(54) METHOD FOR CHLORITE REMOVAL

(75) Inventors: Glenn W. Holden, Spring, TX (US); Gregory D. Simpson, Seabrook, TX (US)

(73) Assignee: Siemens Water Technologies Corp., Warrendale, PA (US)

( * ) Notice: Subject to any disclaimer, the term of this patent is extended or adjusted under 35 U.S.C. 154(b) by 226 days.

(21) Appl. No.: 11/247,858

(22) Filed: Oct. 11, 2005

(65) Prior Publication Data

US 2007/0080116 A1    Apr. 12, 2007

(51) Int. Cl.
*C02F 9/04*    (2006.01)
(52) U.S. Cl. .................................. 210/754; 210/757
(58) Field of Classification Search .............. 210/757, 210/749
See application file for complete search history.

(56) References Cited

U.S. PATENT DOCUMENTS

| | | | |
|---|---|---|---|
| 3,966,450 A | 6/1976 | O'Neill et al. | |
| 4,108,777 A | 8/1978 | Kurita et al. | |
| 5,114,587 A | 5/1992 | Hagerstedt | |
| 5,200,092 A | 4/1993 | Richards et al. | |
| 5,984,993 A | 11/1999 | Mainz et al. | |
| 6,254,894 B1 * | 7/2001 | Denkewicz et al. | 424/618 |
| 2002/0125198 A1 * | 9/2002 | Simpson | 210/749 |

OTHER PUBLICATIONS

Dixon, Kevin L. et al., The Effect of Sulfur-Based Reducing Agents and GAC Filtration on Chlorine Dioxide By-products, Research and Technology, Journal AWWA, May 1991, pp. 48-55.

Grise, Mark H. et al., Using Reducing Agents to Eliminate Chlorine Dioxide and Chlorite Ion Residuals in Drinking Water, Research and Technology, Journal AWWA, May 1991, pp. 56-61.

Gordon, Gilbert et al., Minimizing Chlorite Ion and Chlorate Ion I Water Treated with Chlorine Dioxide, Research and Technology, Journal AWWA, Apr. 1990, pp. 160-165.

Ondrus, Martin G. et al., The Oxidation of Hexaaquoiron (II) by Chlorine (III) in Aqueous Solution, Inorganic Chemistry, vol. II, No. 5, 1972, pp. 985-989.

Greg D. Simpson, Ph.D., The Reduction of the Chlorite Ion, Fourth International Symposium on Chlorine Dioxide, Feb. 15 & 16, 2001, Caesars' Palace, Las Vegas, Nevada., pp. 1-10.

Tarquin, Anthony et al., Reduction of Chlorite Concentrations in Potable Water and Ferrous Chloride, Disinfection Practice, Water/Engineering & Management, Feb. 1995, pp. 35-37.

Hale, Bert et al., Use of Vitamin C and Sodium Erythorbate for Chlorite Reduction—Field Trial Results, AWA A1-MS Section Annual Conference, Beau Rivage Resort and Casino, Biloxi, MS, Oct. 5-7, 2003, pp. 1-10.

* cited by examiner

*Primary Examiner*—Duane Smith
*Assistant Examiner*—Tamiko Toye

(57) ABSTRACT

The invention is directed to a process for removing chlorite ion from a body of water containing unacceptably high levels of chlorite comprising adding to said body of water a chlorite removal chemical selected from the group comprising sodium dichloroisocyanurate dihydrate, sodium dichloroisocyanurate, trichloroisocyanurate, polyaluminum chloride, sodium permanganate, potassium permanganate, and catalase enzyme.

7 Claims, No Drawings

METHOD FOR CHLORITE REMOVAL

FIELD OF THE INVENTION

The herein disclosed invention finds applicability in the field of water purification and in the field of toxic waste removal; and specifically where residues of chlorite are found in aqueous solutions.

BACKGROUND OF THE INVENTION

There is a need in the field of water purification to remove chlorite ion from water prior to use or the disposing of the water in order to make the disposed water non-toxic. Several methods of removing the chlorite ion have been found. These methods all suffer from drawbacks in that pH adjustment is needed, sludge production occurs, or some other drawback results.

The chlorite ion is toxic to several invertebrates which are important in the food chain. Chlorine dioxide (ClO2) in disinfection and other applications results in chlorite ion in the water. When this water flows to a receiving stream or other body of water, chlorite must be reduced to very low levels to meet government regulations.

Chlorite removal is difficult. Known chlorite removal chemistries are slow, produce sludge, require precise pH control or produce unwanted by-products.

Current regulations in some locations require chlorite ion to be at or below 0.006 mg/L in water entering receiving streams; in other locations the amount of chlorite entering the stream may be higher. The dosage of chlorine dioxide (ClO2) is typically 0.5-1.0 mg/L above demand (which can be higher with 2.0 mg/L being typical). For a demand of 2.0 mg/L, an applied dosage of 2.5-3.0 mg/L ClO2 is used. Approximately 50-80% of the applied dosage of ClO2 is ultimately converted to chlorite ion. If 3.0 mg/L is fed, 1.5-2.4 mg/L of chlorite ion can be produced. This amount varies depending upon water conditions. Since many of these systems are once-through, the water velocity is such that any treatment must act quickly and completely to remove chlorite before discharge. Therefore, any treatment must reduce chlorite levels to essentially immeasurable levels of innocuous species in a few seconds. The treatment itself must also be innocuous, in the event of over treatment.

REVIEW OF THE PRIOR ART

Granular Activated Carbon, Reverse Osmosis, and Softening: Although partial or complete removal of chlorite is possible with these technologies, none of these technologies are practical.

Sulfur Dioxide and Sulfite Ion: $SO_2$ and $SO_3^{2-}$ have been shown to remove $ClO_2^-$ by Gordon et al (1990). In the pH range 4.0 to 7.5, the reaction is shown in Equation 1.

$$2SO_3^{2-}+ClO_2^- \rightarrow 2SO_4^{2-}+Cl^- \qquad \text{Equation 1}$$

In the presence of oxygen and at elevated pHs, the reaction chemistry was found to deviate from Equation 1.

Dixon and Lee (1991) and Griese, et al.(1991) observed that the presence of oxygen in the reduction of chlorite with $SO_2$ or $SO_3^{2-}$ resulted in the formation of chlorate. As a result, Dixon and Lee suggested that use of sulfur-based reducing agents for removal of chlorite in potable water is not a viable option.

The reaction of chlorite with $SO_2$ or $SO_3^{2-}$ was found to be complete in less than a minute below a pH of about 5.0. For large industrial once through applications, where 100,000 gpm throughput is common, it is not economically feasible nor environmentally acceptable in many cases to add sufficient acid to depress the pH of the water to <5.0 to get rapid chlorite destruction.

Ferrous Iron: Chlorite ion can be reduced to $Cl^-$ by ferrous iron ($Fe^{2+}$), as shown in the following equation.

$$4Fe^{2+}+ClO_2^-+10H_2O \Leftrightarrow 4Fe(OH)_3(s)+Cl^-+8H^+$$

In this reaction, chlorite ion is reduced to chloride ion, and the iron forms a ferric hydroxide floc which ultimately settles out in the water.

Ondrus and Gordon (1972) investigated the kinetics of the reaction of ferrous iron with chlorite ion and found that at pH<2.0 and high ionic strength condition (2.00 M), the reaction proceeded at a rate that would be acceptable for potable water plants. Tarquin, Hansel, and Rittmann (1995) lateer found that total removal of chlorite was usually achieved in less than 30 minutes with no significant chlorate formation.

In summary, the use of ferrous iron ($Fe^{2+}$) has been used with good results by several potable water facilities.

The use of ferrous iron may be acceptable for potable water facilities, because they have the capability of handling the sludge produced. In addition, their holding time permits a somewhat slower reaction to proceed.

For large industrial once-through facilities, ferrous iron is much too slow and the sludge produced is generally unacceptable.

Ascorbic Acid or Ascorbate or its isomers: Ascorbic acid was found to reduce chlorite to chloride. Although the preliminary results of Simpson (2001) indicated very rapid removal, subsequent studies (Hale 2003) have shown that removal can be slow and pH dependent.

In summary, no good, rapid, environmentally friendly chemistry to reduce chlorite ion has been found.

OBJECTS OF THE INVENTION

An object of this invention is to remove chlorite in aqueous solution.

A further object of this invention is to reduce chlorite in solution safely and rapidly.

A major object of this invention is to produce a method which will reduce chlorite in a manner which is innocuous.

SUMMARY OF THE INVENTION

The inventors have found that several chlorite reducing chemicals result in rapid chlorite removal. The invention herein disclosed is unique in recognizing that a specific amount of sodium dichloroisocyanurate dihydrate, sodium dichloroisocyanurate, trichloroisocyanurate, polyaluminum chloride (50% basicity), sodium permanganate, potassium permanganate, and catalase enzyme function as chlorite reducing chemicals and removed all or a substantial part of the chlorite ion in aqueous solution.

DETAILED DESCRIPTION OF THE INVENTION

Laboratory tests were done which clearly show that addition of each of these compounds resulted in some or all chlorite removal. The test concentration for chlorite ion was 1.98 mg/L. Each reagent was prepared in 4× stoichiometric excess and allowed to react with the chlorite ion in unbuffered distilled water for 15 minutes. Chlorite ion concentrations were determined using ion chromatography (USEPA

Method 300.1). The % loss was calculated by comparing the peak area of the standard solution to a standard solution that contains a reducing agent.

| Reagent | % Chlorite Ion Loss |
|---|---|
| Catalase | 100 More than 4× stoichiometric excess |
| Sodium dichloroisocyanurate | 98.8 |
| Polyaluminum chloride (50% basicity) | 87.8 |
| Sodium permanganate | 64.1 |
| Potassium permanganate | 47.4 |

The invention contemplates a process for removing chlorite ion from a body of water, as for example, a stream containing unacceptably high levels of chlorite comprising adding to said body of water a chlorite removal chemical in the ratio of 0.00001 to 100 parts by weight of chlorite removal chemical. The process can be carried out by using a chlorite removing chemical selected from the group comprising sodium dichloroisocyanurate dihydrate, sodium dichloroisocyanurate, trichloroisocyanurate, polyaluminum chloride, sodium permanganate, potassium permanganate, and catalase enzyme.

The inventors contemplate using mixtures of chlorite removing chemicals which may be synergistic.

Use in once-through cooling water systems. ClO2 is used to control micro and macrofouling. The chlorite ion that results from this treatment is generally above the discharge limits placed by the EPA. A chlorite removal chemical, correctly added, could effectively reduce or eliminate the chlorite ion in the receiving waters.

Use in wastewater to reduce or eliminate chlorite ion that results from ClO2 disinfection. The ClO2 can be applied to the wastewater or it can be applied to a cooling tower or other industrial or environmental process to disinfect or destroy unacceptable molecules, such as phenol.

Potable Water: This includes drinking water, and drinking water to be used for some end use such as in dialysis clinics, where chlorite needs to be zero.

Plant Effluent: This would include once-through cooling water, where biofilm control is targeted, or once through cooling water, where control of zebra mussels is desired. This would include wastewater effluent applications, where the water is disinfected prior to discharge and the chlorite ion needs to be eliminated or reduced to meet NPDES permits. This would include some cooling tower applications, where the water from the cooling tower is not immediately but ultimately discharged.

When used in the field, the inventors contemplate testing water for chlorite and applying effective amounts of the appropriate chemical to rid the water of chlorite.

In this application, the expression chlorite and chlorite ion have been used interchangeably as understood by those skilled in the art.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A process for removing chlorite ion from a body of water containing unacceptably high levels of chlorite comprising adding to said body of water a chlorite removal chemical selected from the group consisting of sodium dichloroisocyanurate dihydrate, sodium dichloroisocyanurate, trichloroisocyanurate, polyaluminum chloride, sodium permanganate, potassium permanganate, and catalase enzyme in the ratio of about 0.000001 to 100 parts by weight of chlorite removal chemical to 1 part of chlorite ion.

2. The process of claim 1 wherein the body of water is a stream.

3. The process of claim 1 wherein the body of water is potable water.

4. The process of claim 1 wherein the body of water is plant effluent.

5. The process of claim 1 wherein the body of water is used in cooling tower applications.

6. The process of claim 1 wherein the body of water is waste water.

7. A process for removing chlorite ion from a body of water containing unacceptably high levels of chlorite comprising adding to said body of water a chlorite removal chemical selected from the group consisting of sodium dichloroisocyanurate dihydrate, sodium dichloroisocyanurate, trichioroisocyanurate, polyaluminum chloride, sodium permanganate, potassium permanganate, and catalase enzyme in an amount of four times a stoichiometric excess of chlorite removal chemical to one part of chlorite ion.

* * * * *